UNITED STATES PATENT OFFICE.

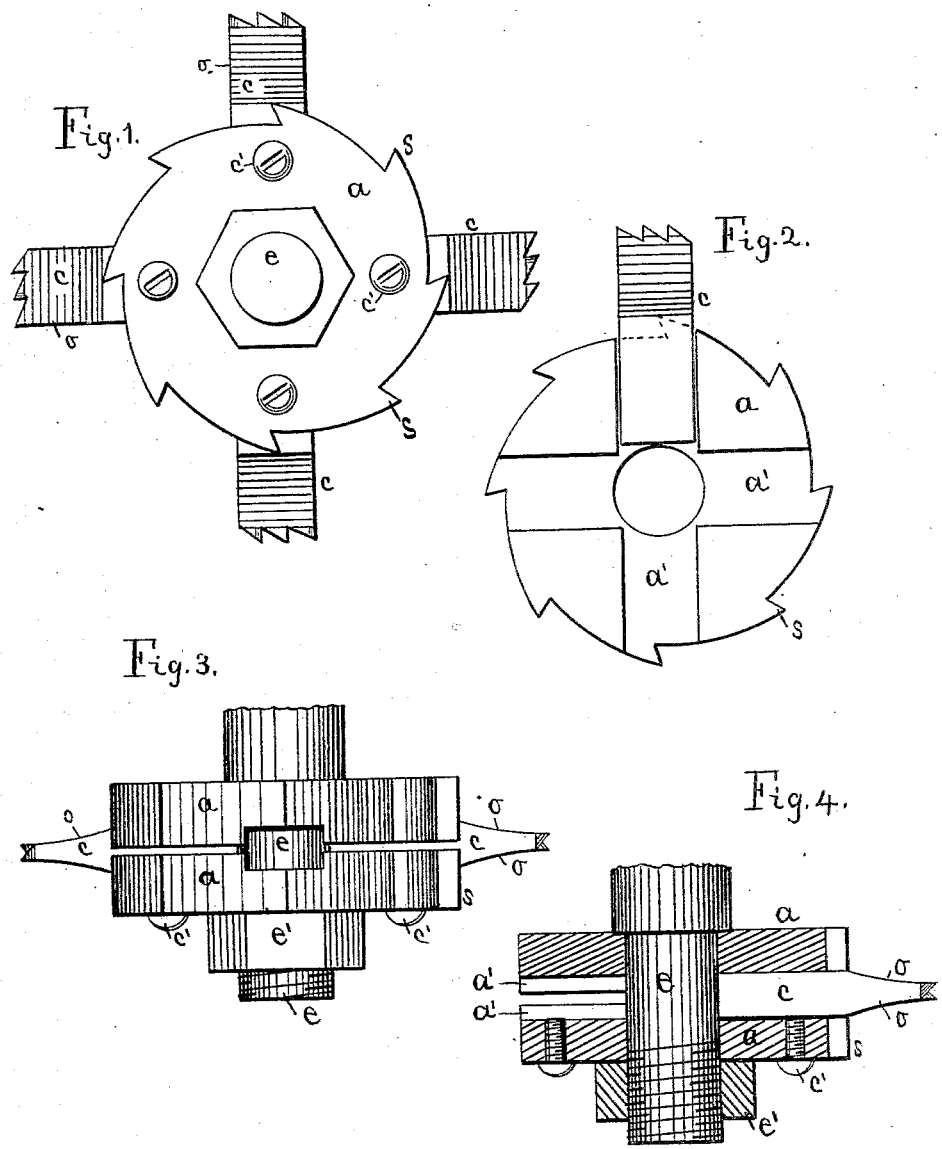

JOSEPH W. BRAINARD, OF KENT, ASSIGNOR TO FRANK W. CONE, OF SAME PLACE, AND FREDERICK W. WOODBRIDGE, OF RAVENNA, OHIO.

CUTTER-HEAD.

SPECIFICATION forming part of Letters Patent No. 303,978, dated August 26, 1884.

Application filed April 2, 1884. (No model.)

*To all whom it may concern:*

Be it known that I, JOSEPH W. BRAINARD, a citizen of the United States, residing at Kent, in the county of Portage and State of Ohio, have invented a new and useful Improvement in Cutter-Heads, of which the following is a specification.

My newly-invented cutter-head is especially designed and adapted for making blind-slats. It consists of a rotary cutter in two sections, placed side by side on a shaft, and having grooves formed in their contiguous sides, in which are held radial cutters formed with saw-teeth on their outer ends, and having side edges to finish the sides of the slats, the cutters being held together by compression, as hereinafter more fully described.

In the drawings forming a part of this specification, Figure 1 is a front view of the cutter-head. Fig. 2 is a like view of one section or part of the cutter-head with one of the radial cutters. Fig. 3 is a vertical view or plan of the cutter-head with the upper radial cutter removed, and Fig. 4 is a horizontal section of the cutter-head with one of the radial cutters removed.

The cutter-head is formed in two similar sections, $a\ a$, with cutting-teeth $s$ across their peripheries, and radial grooves $a'$ in their contiguous sides, in which radial cutters $c$ are held by compression. The cutting-teeth $s$ on sections $a\ a$ shape the edges of the blind-slats, and the cutters $c$ shape the sides of the slats. The outer end of each cutter $c$ is formed with saw-teeth, and is beveled on both sides, forming inclined or concave edges $o\ o$ at the angles of the sides with the face of the cutter, to shape the blind-slats with beveled or convex sides. Cutters $c$ are thus beveled from their outer ends in as far as teeth $s$ on the peripheries of sections $a\ a$. Sections $a\ a$ are held firmly together on shaft $e$, with cutters $c$ between them in grooves $a'$, by means of nut $e'$ on the screw-threaded end of the shaft. Set-screws $c'$, through the sides of one of the sections $a$, are used to more firmly hold cutters $c$ in position. The inclined edges $o\ o$ of the cutters may be made either straight or concave, as may be desired.

The cutters may be removed to be sharpened, and readjusted in their grooves $a'$ by turning nut $e'$ and set-screws $c'$. These cutters may also be held by compression between sections $a\ a$ on shaft, by means of a wedge in a slot to be formed through shaft $e$, or any other well-known means, in place of nut $e'$.

I claim as my invention—

1. A cutter-head formed with cutters $s$ on its periphery, and cutters $c$, having saw-teeth on their outer ends and beveled to form inclined side edges, $o$, the cutters $c$ with their side edges, $o$, projecting from the periphery beyond cutters $s$, which extend laterally farther than cutters $c$, substantially as described.

2. A cutter-head formed of sections $a\ a$, having cutting-teeth on their peripheries and grooves $a'$ in their contiguous sides, in combination with adjustable cutters $c$ in said grooves and projecting beyond the peripheries of sections $a\ a$, substantially as described.

3. The combination of shaft $e$, sections $a\ a$, formed with cutters $s$, and with grooves $a'$, and a series of adjustable cutters, $c$, projecting beyond cutters $s$, and firmly held in grooves $a'$ by compression, substantially as described.

J. W. BRAINARD.

Witnesses:
 W. W. PATTON,
 E. J. DARROW.